(12) United States Patent
Hu et al.

(10) Patent No.: US 12,432,723 B2
(45) Date of Patent: Sep. 30, 2025

(54) COMMUNICATION METHOD, AND RELATED APPARATUS AND DEVICE

(71) Applicant: HUAWEI TECHNOLOGIES CO., LTD., Guangdong (CN)

(72) Inventors: Dan Hu, Beijing (CN); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 519 days.

(21) Appl. No.: 17/836,201

(22) Filed: Jun. 9, 2022

(65) Prior Publication Data
US 2022/0322400 A1 Oct. 6, 2022

Related U.S. Application Data

(63) Continuation of application No. PCT/CN2019/124145, filed on Dec. 9, 2019.

(51) Int. Cl.
*H04W 72/00* (2023.01)
*H04L 27/26* (2006.01)
(Continued)

(52) U.S. Cl.
CPC ... *H04W 72/1273* (2013.01); *H04L 27/26025* (2021.01); *H04W 72/0446* (2013.01); *H04W 72/0453* (2013.01); *H04W 72/23* (2023.01)

(58) Field of Classification Search
CPC ............. H04W 72/1273; H04W 72/23; H04W 72/0446; H04W 72/0453; H04L 27/26025; H04L 370/329
See application file for complete search history.

(56) References Cited

U.S. PATENT DOCUMENTS

| 12,156,208 B2 * | 11/2024 | Xu | H04W 72/1273 |
| 2012/0275400 A1 * | 11/2012 | Chen | H04J 11/0033 370/329 |

(Continued)

FOREIGN PATENT DOCUMENTS

| CN | 104838709 B * | 7/2019 | H04W 4/08 |
| WO | 2019158005 A1 | 8/2019 | |

(Continued)

OTHER PUBLICATIONS

LG Electronics, "Discussion on resource allocation and TBS determination," 3GPP TSG RAN WG1 Meeting 91, R1-1719929, Reno, USA, Nov. 27-Dec. 1, 2017, 16 pages.

(Continued)

*Primary Examiner* — Khai M Nguyen
(74) *Attorney, Agent, or Firm* — Fish & Richardson P.C.

(57) ABSTRACT

The present disclosure relates to communication methods, apparatus, and devices. In one example method, a terminal device receives first indication information, where the first indication information indicates a first frequency domain resource, the first frequency domain resource is a subset of a frequency domain resource corresponding to a first bandwidth part (BWP), and the first BWP is a dedicated BWP of the terminal device. The terminal device receives a first physical downlink control channel (PDCCH) on the first BWP, where the first PDCCH is scrambled by using a group-radio network temporary identifier (G-RNTI), and the first PDCCH schedules a first physical downlink shared channel (PDSCH) within a range of the first frequency domain resource. The terminal device receives second indication information including a first frequency domain width. The terminal device receives the first PDSCH on the first frequency domain resource.

20 Claims, 5 Drawing Sheets

(51) Int. Cl.
    *H04W 72/0446*     (2023.01)
    *H04W 72/0453*     (2023.01)
    *H04W 72/1273*     (2023.01)
    *H04W 72/23*     (2023.01)

(56) References Cited

U.S. PATENT DOCUMENTS

| | | |
|---|---|---|
| 2019/0141695 A1 | 5/2019 | Babaei et al. |
| 2019/0215807 A1* | 7/2019 | Hwang .................... H04L 5/00 |
| 2019/0254053 A1 | 8/2019 | Ying et al. |
| 2019/0274032 A1 | 9/2019 | Chatterjee et al. |
| 2020/0296758 A1 | 9/2020 | Li et al. |

FOREIGN PATENT DOCUMENTS

| | | | | |
|---|---|---|---|---|
| WO | WO-2019160816 A1 * | 8/2019 | ....... | H04L 25/03866 |
| WO | WO-2020255415 A1 * | 12/2020 | | |

OTHER PUBLICATIONS

PCT International Search Report and Written Opinion issued in International Application No. PCT/CN2019/124145 on Aug. 28, 2022, 15 pages (with English translation).
Extended European Search Report issued in European Application No. 19956090.5 on Oct. 5, 2022, 9 pages.
Office Action in Indian Appln. No. 202247033758, dated Jun. 13, 2022, 7 pages (with English translation) .

* cited by examiner

RB: Resource block

COMMUNICATION METHOD, AND RELATED APPARATUS AND DEVICE

CROSS-REFERENCE TO RELATED APPLICATIONS

This application is a continuation of International Application No. PCT/CN2019/1241415, filed on Dec. 9, 2019, the disclosure of which is hereby incorporated by reference in its entirety.

TECHNICAL FIELD

This application relates to the field of communication technologies, and in particular, to a communication method, and a related apparatus and device.

BACKGROUND

Currently, typical bandwidth (namely, system bandwidth) supported by 5th generation (5G) mobile communication new radio (NR) is 100 MHz (megahertz). User equipment (UE) does not need to support bandwidth of a same size as that supported by a network device (for example, a base station gNB in 5G). The UE receives and sends information only in operating bandwidth. Usually, the network device configures a bandwidth part (BWP) for the UE to receive and send information, and the configured BWP is the operating bandwidth of the UE. In downlink transmission in 5G NR, a maximum of four downlink bandwidth parts (downlink BWPs, DL BWPs) may be configured for one UE on one component carrier (CC). However, at a same moment, one UE can have only one BWP in an active state, which is referred to as an active BWP. The UE can send and receive information only on the active BWP.

For broadcast/multicast/groupcast downlink transmission, the network device usually sends a physical downlink control channel (PDCCH) for scheduling a physical downlink shared channel (PDSCH) to a group of UEs. The group of UEs receive the PDCCH-scheduled PDSCH on a same time-frequency resource. However, because each UE in the group of UEs that receive the same broadcast/multicast/groupcast downlink transmission has a respective active BWP, a resource of the active BWP of each UE in frequency domain is independently configured. Therefore, if the active BWPs of all the UEs cannot be aligned in frequency domain, the network device cannot send broadcast/multicast/groupcast data to the group of UEs on a uniform frequency domain resource. In other words, when the network device sends a PDCCH to a group of UEs on a frequency domain resource, some UEs in the group of UEs may not receive the PDCCH because each UE can receive and send information only on an active BWP of the UE. Consequently, broadcast/multicast/groupcast communication cannot be implemented on a uniform frequency domain resource.

SUMMARY

Embodiments of this application provide a communication method, and a related apparatus and device, to implement broadcast/multicast/groupcast communication for 5G NR, and implement broadcast/multicast/groupcast data transmission on a uniform frequency domain resource.

The following describes this application from different aspects. It should be understood that mutual reference may be made to the following implementations and beneficial effects of the different aspects.

According to a first aspect, an embodiment of this application provides a communication method. The method is applicable to a terminal device (such as UE) in 5G NR broadcast/multicast/groupcast communication, and includes: The terminal device receives first indication information from a network device, may receive a first PDCCH on a first BWP, may receive second indication information, and receives, on a first frequency domain resource indicated by the first indication information, a first PDSCH scheduled by the first PDCCH. Optionally, the terminal device may parse the received first PDSCH to obtain user data information carried on the first PDSCH. A parsing range of the first PDSCH is the first frequency domain resource. The first indication information may indicate the first frequency domain resource, and the first frequency domain resource may be a subset or a proper subset of a frequency domain resource corresponding to the first BWP. The first BWP is a dedicated BWP (UE dedicated BWP) of the terminal device, and the first BWP is an active BWP of the terminal device, that is, the terminal device sends and receives information on the first MYR The first PDCCH carries DCI, and may be scrambled by using a G-RNTI. The first PDCCH may further schedule the first PDSCH within a range of the first frequency domain resource, that is, a range indicated by a frequency domain resource allocation information field of the first PDCCH is the first frequency domain resource. Optionally, the first frequency domain resource may be a frequency domain resource corresponding to a sub-BWP, and the sub-BWP may be a subset or a proper subset of the first BWP. Optionally, a function of the PDCCH may be determined by an RNTI for scrambling the PDCCH, and the first PDCCH scrambled by using the G-RNTI is a PDCCH for broadcast/multicast/groupcast transmission.

In an optional embodiment, the second indication information may alternatively indicate a first frequency domain width or some frequency domain parameters in an implicit manner or another manner, the second indication information is associated with the second resource, and the terminal device may determine a second frequency domain resource based on a mapping relationship between the second indication information and the second resource.

Optionally, the second indication information includes the first frequency domain width, and the first frequency domain width is for determining the second frequency domain resource. The first frequency domain resource and the second frequency domain resource are separately configured by the network device independently, that is, the configuration of the first frequency domain resource does not rely on the configuration of the second frequency domain resource. The terminal device may directly determine the second frequency domain resource based on the configuration of the second frequency domain resource, without relying on a parameter notified during the configuration of the first frequency domain resource. It may be understood that a starting frequency domain position of the first frequency domain resource is different from a starting frequency domain position of the second frequency domain resource, and/or a frequency domain width of the first frequency domain resource is different from a frequency domain width of the second frequency domain resource. The starting frequency domain position of the first frequency domain resource may be an RB (lowest RB) with a smallest index number (namely, sequence number) in any subset or proper subset of a frequency domain resource corresponding to the first BWP. The starting frequency domain position of the second frequency domain resource is an RB with a smallest index number (namely, sequence number) in a control resource set (CORESET) or a predefined BWP for receiving the first PDCCH (where the first PDCCH herein is a PDCCH scrambled by using a G-RNTI). The frequency domain width of the first frequency domain resource may be flexibly configured, to be specific, the frequency domain width of the first frequency domain resource may be any RB quantity of the subset or the proper subset of the frequency domain resource corresponding to the first BWP. The frequency domain width (namely, the first frequency domain width) of the second frequency domain resource may be a quantity of contiguous RBs corresponding to the CORESET 0. The CORESET 0 may be indicated by a system message or configured by using higher layer signaling. The RB quantity of the CORESET 0 may be set to 24, 48, or 96.

In this embodiment of this application, the terminal device receives the first frequency domain resource indicated by the network device by using the indication information, and receives and parses, on the first frequency domain resource, the first PDSCH scheduled by the first PDCCH, to obtain the user data information carried on the first PDSCH. In addition, because the first PDCCH is scrambled by using the G-RNTI, it indicates that the first PDCCH is the PDCCH for the broadcast/multicast/groupcast transmission. It also indicates that data carried on the first PDSCH scheduled by the first PDCCH is broadcast/multicast/groupcast transmission data. Therefore, according to the communication method provided in this embodiment of this application, the broadcast/multicast/groupcast communication can be implemented for 5G NR, and the broadcast/multicast/groupcast data transmission can be implemented on a uniform frequency domain resource (the first frequency domain resource).

With reference to the first aspect, in a possible implementation, that the terminal device receives a first PDCCH on the first BWP includes: The terminal device may receive the first PDCCH on the first frequency domain resource. Optionally, the terminal device may parse the received first PDCCH, to obtain the DCI carried on the first PDCCH. A parsing process herein may include processing such as demodulation and decoding. A format of the DCI carded on the first PDCCH may be non-fallback DCI, for example, DCI format 1_1. The range indicated by the frequency domain resource allocation information field of the first PDCCH does not exceed the first frequency domain resource.

In this embodiment of this application, the terminal device directly receives and parses the first PDCCH on the first frequency domain resource, so that a frequency domain range for receiving the downlink broadcast/multicast/groupcast transmission is narrowed, processing efficiency can be improved, and a processing latency can be reduced.

With reference to the first aspect, in a possible implementation, after that the terminal device receives a first PDCCH on the first BWP, the method further includes: The terminal device may parse the first PDCCH on the frequency domain resource corresponding to the first BWP, to obtain the DCI carried on the first PDCCH. A parsing process herein may include processing such as demodulation and decoding. A format of the DCI carried on the first PDCCH may be non-fallback DCI, for example, DCI format 1_1. The range indicated by the frequency domain resource allocation information field of the first PDCCH does not exceed the frequency domain resource corresponding to the first BWP.

In this embodiment of this application, the terminal device parses the first PDCCH on the frequency domain resource corresponding to the first BWP, to obtain DCI that is more complete. This also indicates that a frequency domain resource of the first PDCCH may be the frequency domain resource corresponding to the first BWP, so that flexibility of the frequency domain resource of the first PDCCH can be improved.

With reference to the first aspect, in a possible implementation, before that the terminal device receives a first PDCCH on the first BWP, the method further includes: The terminal device receives third indication information from the network device, where the third indication information may indicate a format of the DCI carried on the first PDCCH, and the format of the DCI carried on the first PDCCH is non-fallback DCI. The non-fallback DCI herein may be DCI format 1_1, or another DCI format other than fallback DCI (DCI format 1_0). The non-fallback DCI may include control information that is not included in the fallback DCI, for example, one or more of a carrier indication, a BWP indication, a physical resource block bundling size indicator, a rate matching indicator, a zero power channel state information reference signal trigger, a sounding reference signal request, an antenna port, or a transmission configuration indicator.

In this embodiment of this application, the PDSCH may be scheduled by using the non-fallback DCI. In addition, because the non-fallback DCI can carry richer control information than the fallback DCI, multi-antenna/multi-user transmission can be supported (where this is because the non-fallback DCI includes the antenna port and the transmission configuration indicator), and flexibility of the broadcast/multicast/groupcast transmission in 5G NR can be improved.

With reference to the first aspect, in a possible implementation, before that the terminal device receives a first PDCCH on the first BWP, the method further includes: The terminal device receives fourth indication information from the network device, where the fourth indication information may indicate a first control resource set. A frequency domain resource corresponding to the first control resource set may be a subset or a proper subset of the first frequency domain resource.

In this embodiment of this application, the frequency domain resource corresponding to the first control resource set is limited to the first frequency domain resource, so that when parsing the first PDCCH on the first frequency domain resource, the terminal device can also obtain complete DCI through parsing.

With reference to the first aspect, in a possible implementation, before that the terminal device receives a first PDCCH on the first BWP, the method further includes: The terminal device receives fifth indication information from the network device, where the fifth indication information may indicate a first common search space associated with the first control resource set. The first common search space may be for monitoring the first PDCCH. The first common search space may be common to all terminal devices or a group of terminal devices in a cell, that is, all the terminal devices or the group of terminal devices can detect, in the first common search space, the first PDCCH scrambled by using the G-RNTI and a PDCCH scrambled by using another RNTI. Alternatively, the first common search space may be search space configured for the first PDCCH scrambled by using the G-RNTI, that is, all terminal devices or a group of terminal devices can detect, in the first common search space, only the first PDCCH scrambled by using the G-RNTI.

A possible position of a PDCCH may be determined by using a control resource set and a common search space. Therefore, in this embodiment of this application, the terminal device receives the first control resource set and the first search space that are indicated by the network device, to determine a possible position of the first PDCCH, and assist the terminal device in receiving the first PDCCH.

With reference to the first aspect, in a possible implementation, the first indication information may include at least one of the starting frequency domain position, the frequency domain width, or a numerology of the first frequency domain resource. The numerology may include a subcarrier spacing and a cyclic prefix. The numerology of the first frequency domain resource is the same as a numerology of the first BWP, to be specific, a subcarrier spacing of the first frequency domain resource is the same as a subcarrier spacing of the first BWP, and a cyclic prefix of the first frequency domain resource is the same as a cyclic prefix of the first BWP.

According to a second aspect, an embodiment of this application provides another communication method. The method is applicable to a terminal device (such as a gNB) in 5G NR broadcast/multicast/groupcast communication, and includes: The network device may determine a first frequency domain resource, may send first indication information to a group of terminal devices, may send a first PDCCH to the group of terminal devices, may send second indication information including a first frequency domain width, and sends a first PDSCH on the first frequency domain resource. The group of terminal devices may be a group of terminal devices that are in a cell and that receive broadcast/multicast/groupcast transmission. The first indication information may indicate the first frequency domain resource, and the first frequency domain resource may be a subset or a proper subset of a frequency domain resource corresponding to a first BWP. The first BWP is a dedicated BWP (UE dedicated BWP) of the terminal device, and the first BWP is an active BWP of the terminal device, that is, the terminal device sends and receives information on the first BWP. The first PDCCH carries DCI, and may be scrambled by using a G-RNTI. The first PDCCH may further schedule the first PDSCH within a range of the first frequency domain resource, that is, a range indicated by a frequency domain resource allocation information field of the first PDCCH is the first frequency domain resource. The first PDSCH carries user data information. Optionally, the first frequency domain resource may be a frequency domain resource corresponding to a sub-BWP, and the sub-BWP may be a subset or a proper subset of the first BWP. Optionally, a function of the PDCCH may be determined by an RNTI for scrambling the PDCCH, and the first PDCCH scrambled by using the G-RNTI is a PDCCH for broadcast/multicast/groupcast transmission.

In an optional embodiment, the second indication information may alternatively indicate the first frequency domain width or some frequency domain parameters in an implicit manner or another manner, the second indication information is associated with the second resource, and the terminal device may determine a second frequency domain resource based on a mapping relationship between the second indication information and the second resource.

Optionally, the second indication information includes the first frequency domain width, and the first frequency domain width is for determining the second frequency domain resource. The first frequency domain resource and the second frequency domain resource are separately configured by the network device independently, that is, the configuration of the first frequency domain resource does not rely on the configuration of the second frequency domain resource. The terminal device may directly determine the second frequency domain resource based on the configuration of the second frequency domain resource, without relying on a parameter notified during the configuration of the first frequency domain resource. It may be understood that a starting frequency domain position of the first frequency domain resource is different from a starting frequency domain position of the second frequency domain resource, and/or a frequency domain width of the first frequency domain resource is different from a frequency domain width of the second frequency domain resource. The starting frequency domain position of the first frequency domain resource may be an RB (lowest RB) with a smallest index number (namely, sequence number) in any subset or proper subset of a frequency domain resource corresponding to the first BWP. The starting frequency domain position of the second frequency domain resource is an RB with a smallest index number (namely, sequence number) in a control resource set (namely, a CORESET) or a predefined BWP for receiving the first PDCCH (where the first PDCCH herein is a PDCCH scrambled by using a G-RNTI). The frequency domain width of the first frequency domain resource may be flexibly configured, to be specific, the frequency domain width of the first frequency domain resource may be any RB quantity of the subset or the proper subset of the frequency domain resource corresponding to the first BWP. The frequency domain width (namely, the first frequency domain width) of the second frequency domain resource may be a quantity of contiguous RBs corresponding to a CORESET 0. The CORESET 0 may be indicated by a system message or configured by using higher layer signaling. The RB quantity of the CORESET 0 is 24, 48, or 96.

In this embodiment of this application, the network device configures, in a frequency domain resource corresponding to the dedicated BWP (UE dedicated BWP) of the terminal device, the first frequency domain resource for the broadcast/multicast/groupcast transmission. When the terminal device needs to receive unicast transmission, the terminal device activates the UE dedicated BWP, and the terminal device may also receive groupcast transmission on the active BWP (where this is because some frequency domain resources of the active BWP are configured for the broadcast/multicast/groupcast transmission). That is, the unicast transmission and the groupcast transmission may be completed in one BWP. Therefore, there is no need to additionally configure operating bandwidth for the broadcast/multicast/groupcast transmission. When the terminal device needs to frequently receive unicast transmission and groupcast transmission, there is no need to switch back and forth between unicast operating bandwidth and groupcast operating bandwidth, so that a switching latency is reduced.

With reference to the second aspect, in a possible implementation, when sending the first PDCCH, the network device may send the first PDCCH on the first frequency domain resource. The range indicated by the frequency domain resource allocation information field of the first PDCCH does not exceed the first frequency domain resource.

With reference to the second aspect, in a possible implementation, before that the network device sends a first PDCCH, the method further includes: The network device may send third indication information to all terminal devices in a cell, where the third indication information may indicate a format of the DCI carried on the first PDCCH, and the format of the DCI carried on the first PDCCH is non-fallback DCI. The non-fallback DCI herein may be DCI format 1_1, or another DCI format other than fallback DCI (DCI format 1_0). The non-fallback DCI may include control information that is not included in the fallback DCI, for example, one or more of a carrier indication, a BWP indication, a physical resource block bundling size indicator, a rate matching indicator, a zero power channel state information reference signal trigger, a sounding reference signal request, an antenna port, or a transmission configuration indicator.

With reference to the second aspect, in a possible implementation, before that the network device sends a first PDCCH, the method further includes: The network device may send fourth indication information, where the fourth indication information may indicate a first control resource set. A frequency domain resource corresponding to the first control resource set may be a subset or a proper subset of the first frequency domain resource.

With reference to the second aspect, in a possible implementation, before that the network device sends a first PDCCH, the method further includes: The network device may send fifth indication information, where the fifth indication information may indicate a first common search space associated with the first control resource set. The first common search space may be for monitoring the first PDCCH. The first common search space may be common to all terminal devices or a group of terminal devices in a cell, that is, all the terminal devices or the group of terminal devices can detect, in the first common search space, the first PDCCH scrambled by using the G-RNTI and a PDCCH scrambled by using another RNTI. Alternatively, the first common search space may be search space configured for the first PDCCH scrambled by using the G-RNTI, that is, all terminal devices or a group of terminal devices can detect, in the first common search space, only the first PDCCH scrambled by using the G-RNTI.

With reference to the second aspect, in a possible implementation, the first indication information may include at least one of the starting frequency domain position, the frequency domain width, or a numerology of the first frequency domain resource. The numerology may include a subcarrier spacing and a cyclic prefix. The numerology of the first frequency domain resource is the same as a numerology of the first BWP, to be specific, a subcarrier spacing of the first frequency domain resource is the same as a subcarrier spacing of the first BWP, and a cyclic prefix of the first frequency domain resource is the same as a cyclic prefix of the first BWP.

According to a third aspect, an embodiment of this application provides a terminal device. The terminal device includes units and/or modules configured to perform the communication method provided in any one of the first aspect and/or the possible implementations of the first aspect. Therefore, beneficial effects (or advantages) of the communication method provided in the first aspect can also be achieved.

According to a fourth aspect, an embodiment of this application provides a network device. The network device includes units and/or modules configured to perform the communication method provided in any one of the second aspect and; or the possible implementations of the second aspect. Therefore, beneficial effects (or advantages) of the communication method provided in the second aspect can also be achieved.

According to a fifth aspect, an embodiment of this application provides a terminal device, including a processor, a transceiver, and a memory. The memory is configured to store a computer program. The transceiver is configured to receive and send various information. The computer program includes program instructions. When running the program instructions, the processor performs the communication method in the first aspect.

According to a sixth aspect, an embodiment of this application provides a network device, including a processor, a transceiver, and a memory. The memory is configured to store a computer program. The transceiver is configured to receive and send various information. The computer program includes program instructions. When running the program instructions, the processor performs the communication method in the second aspect.

According to a seventh aspect, an embodiment of this application provides a computer-readable storage medium. The computer-readable storage medium stores computer program instructions. When the computer program instructions are run on a computer, the computer is enabled to perform the communication method in the first aspect.

According to an eighth aspect, an embodiment of this application provides a computer-readable storage medium. The computer-readable storage medium stores computer program instructions. When the computer program instructions are run on a computer, the computer is enabled to perform the communication method in the second aspect.

According to a ninth aspect, an embodiment of this application provides a computer program product. The computer program product includes computer program code. When the computer program code is run on a computer, the computer is enabled to perform the communication method in the first aspect.

According to a tenth aspect, an embodiment of this application provides a computer program product. The computer program product includes computer program code. When the computer program code is run on a computer, the computer is enabled to perform the communication method in the second aspect.

According to an eleventh aspect, an embodiment of this application provides a communication apparatus. The communication apparatus has functions of the terminal device according to any one of the possible implementations of the first aspect. These functions may be implemented by hardware, or may be implemented by hardware by executing corresponding software. The hardware or the software includes one or more modules corresponding to the functions.

According to a twelfth aspect, an embodiment of this application provides a communication apparatus. The communication apparatus has functions of the network device according to any one of the possible implementations of the second aspect. These functions may be implemented by hardware, or may be implemented by hardware by executing corresponding software. The hardware or the software includes one or more modules corresponding to the functions.

According to a thirteenth aspect, an embodiment of this application provides a chip, including a processor. The processor is configured to read and execute a computer program stored in a memory, to perform the communication method in any one of the possible implementations of the first aspect or the second aspect. Optionally, the chip further includes the memory, and the memory is connected to the processor by using a circuit or a wire. Further, optionally, the chip further includes a communication interface, and the processor is connected to the communication interface. The communication interface is configured to receive data and; or information that need/needs to be processed. The processor obtains the data and/or the information from the communication interface, processes the data and/or the information, and outputs a processing result through the communication interface. The communication interface may be an input/output interface.

Optionally, the processor and the memory may be physically independent units, or the memory may be integrated with the processor.

According to a fourteenth aspect, an embodiment of this application provides a communication system. The communication system includes a terminal device and a network device. The terminal device is the terminal device in the communication method described in any one of the first aspect or the possible implementations of the first aspect, and the network device is the network device in the communication method described in any one of the second aspect or the possible implementations of the second aspect.

Through implementation of embodiments of this application, the broadcast/multicast/groupcast communication can be implemented for 5G NR, and the broadcast/multicast/groupcast data transmission can be implemented on the uniform frequency domain resource.

DESCRIPTION OF EMBODIMENTS

Figure 1:
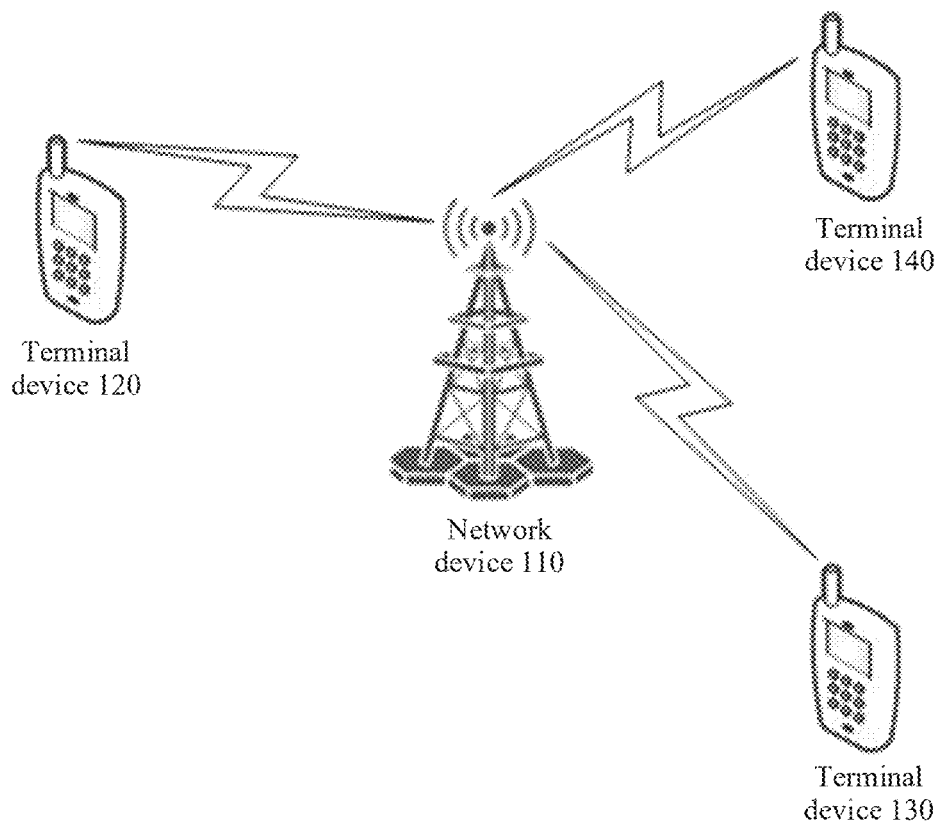
FIG. 1 is a schematic diagram of an architecture of a mobile communication system according to an embodiment of this application.

The following clearly describes the technical solutions in embodiments of this application with reference to the accompanying drawings in embodiments of this application.

To better understand a communication method provided in embodiments of this application, the following briefly describes some terms (nouns) in the communication method provided in embodiments of this application.

1. Dedicated Bandwidth CUE Dedicated BWP) of a Terminal Device

A maximum of four DL MVPs may be configured for one UE on one component carrier by using a higher-layer parameter, such as the higher-layer parameter BWP-Downlink or initialDownlinkBWP. DL BWPs are classified into three types: initial BWP, dedicated BWP, and default BWP. The initial BWP is a BWP configured for the UE in an initial access phase, and may be for transmitting a PDSCH for remaining minimum system information (RMSI), a contention-based random access message 2 (MSG2), and a contention-based random access message 4 (MSG4). The dedicated BWP is a BWP configured for the UE in a radio resource control (RRC) connected mode, and may be for transmitting a data service, for example, an ultra high-definition video, augmented reality (AR), or virtual reality (VR). In a cell, initial BWPs of all UEs are the same, and dedicated BWPs of different UEs are independently configured, that is, the dedicated BWPs of the different UEs may be different.

2. Active BWP

For one UE, only one BWP can be in an active state at each moment. The BWP in the active state is referred to as an active BWP, and the UE can receive and send information only on the active BWP. Selection and switching of the active BWP may be implemented in the following several manners: (1) Downlink control information (DCI) carried on a PDCCH is used for dynamic indication. For example, a DL is activated by using DCI format 1_1. A bandwidth part indication information field (or a BWP indication) in the DCI indicates an active DL BWP for downlink receiving. (2) Activation and deactivation of a BWP are controlled by using a BWP inactivity timer (bwp-Inactivity Timer) (where when the BWP inactivity timer expires, it indicates that the current BWP is deactivated). (3) RRC signaling is used for semi-static configuration. (4) A random access process is triggered by a media access control (MAC) entity.

3. Physical Downlink Control Channel (PDCCH)

The PDCCH carries scheduling and other control information, specifically including a transport format, resource preemption, an uplink/downlink scheduling grant, power control, uplink retransmission information, and the like. The PDCCH is a set of physical resource elements, and carries downlink control information (DCI), including resource allocation and other control information on one or more UEs.

4. Downlink Control Information (DCI)

The DCI is carried on a. PDCCH, and is downlink control information sent by a network device to UE, including uplink and downlink resource allocation, hybrid automatic repeat request (HAW)) information, power control, and the like. Downlink scheduling grant DCI may include two formats: DCI format 1_0 and DCI format 1_1. The DCI format 1_0 is fallback DCI, and is downlink control information transmitted in an RRC initial access state or during cell switching. The DCI format 1_0 may also be for scheduling a PDSCH that carries paging information, initial access response information, and a system message. The DCI format 1_1 is non-fallback DCI, and is for PDSCH scheduling in an RRC connected mode. A cyclic redundancy check (CRC) sequence for scrambling the DCI may be a radio network temporary identifier (RNTI). For example, an RNTI for scrambling the DCI format 1_0 may include a paging-radio network temporary identifier (paging-RNTI, P-RNTI), a random access-radio network temporary identifier (random access-RNTI, RA-RNTI), a system information-radio network temporary identifier (system information-RNTI, SI-RNTI), a cell-radio network temporary identifier (cell-RNTI, C-RNTI), a temporary cell-radio network temporary identifier (temporary cell-RNTI, TC-RNTI), a configured scheduling-radio network temporary identifier (configured scheduling-RNTI, CS-RNTI), or a modulation and coding scheme-cell-radio network temporary identifier (modulation and coding scheme-cell-RNTI, MCS-C-RNTI).

5. Search Space

The search space is a set of PDCCH candidates at an aggregation level. The aggregation level is a quantity of control channel elements (CCEs) constituting a PDCCH, a CCE is a basic unit constituting the PDCCH, and one CCE occupies six resource element groups (REGs) in frequency domain. Types of the search space may include a common search space and a UE-specific search space. For the UE-specific search space, only one UE can monitor the PDCCH in the search space. For the common search space, a plurality of UEs can monitor the PDCCH in the search space.

6. Control Resource Set (CORESET)

In a 5G NR system, information such as a quantity of frequency bands occupied by a PDCCH in frequency domain and a quantity of orthogonal frequency division multiplexing (OFDM) symbols occupied by the PDCCH in time domain is encapsulated in a control resource set; and information such as a start OFDM symbol number of the PDCCH and a monitoring periodicity of the PDCCH is encapsulated in a search space. A possible position of the PDCCH may be determined by using the control resource set and the search space.

7. Physical Downlink Shared Channel (PDSCH)

The PDSCH may be for carrying data from a transmission channel.

8. Resource Block (RB)

In time domain, a minimum resource granularity is one OFDM symbol. In frequency domain, a minimum resource granularity is one subcarrier. One OFDM symbol in time domain and one subcarrier in frequency domain are referred to as one time-frequency resource element (RE). Resource mapping is performed at a physical layer on an RE basis. All OFDM symbols in one slot and 12 consecutive subcarriers in frequency domain constitute one resource block RB, that is, one RB=12 subcarriers. Bandwidth of one RB is 12×Subcarrier spacing. Every four consecutive REs are referred to as one resource element group (REG). Every nine REGs are one CCE The foregoing briefly describes some terms (nouns) in the communication method provided in embodiments of this application. The following describes a system architecture of the communication method provided in embodiments of this application.

The communication method provided in embodiments of this application may be applied to an NR system in a 5th generation mobile communication system and/or a future mobile communication system. For ease of understanding, a system architecture of the mobile communication system is first briefly described in embodiments of this application.

FIG. 1 is a schematic diagram of an architecture of a mobile communication system according to an embodiment of this application. As shown in FIG. 1, the mobile communication system may include a network device 110 and at least two terminal devices (for example, a terminal device 120, a terminal device 130, and a terminal device 140 in FIG. 1). A terminal device may be wirelessly connected to the network device. The terminal device may be located at a fixed position, or may be mobile. FIG. 1 is merely a schematic diagram. The mobile communication system may further include another network device, for example, may further include a wireless relay device and/or a wireless backhaul device, which are/is not shown in FIG. 1. Quantities of network devices and terminal devices included in the mobile communication system are not limited in embodiments of this application.

The network device may be an entity, for example, a gNB, that is configured to transmit or receive a signal on a network side. The network device may alternatively be an access device for the terminal device to wirelessly access the mobile communication system. For example, the network device may be a base station NodeB, an evolved base station (evolved NodeB, eNB), a transmission reception point (TRP), a next generation base station (next generation NodeB, gNB) in a 5G mobile communication system, a base station in a future mobile communication system, an access node in a Wi-Fi system, or the like. A specific technology and a specific device form that are used by the network device are not limited in embodiments of this application.

The terminal device may be an entity, for example, mobile phone UE, that is configured to receive or transmit a signal on a user side. The terminal device may also be referred to as a terminal. UE, a mobile station (MS), a mobile terminal (MT), or the like. The terminal device may be a mobile phone, a tablet computer, a computer that has a wireless transceiver function, a virtual reality (VR) terminal, an augmented reality (AR) terminal device, a wireless terminal in industrial control, a wireless terminal in self-driving, a wireless terminal in remote surgery, a wireless terminal in a smart grid, a wireless terminal in transportation safety, a wireless terminal in a smart city, a wireless terminal in a smart home, or the like. A specific technology and a specific device form that are used by the terminal device are not limited in embodiments of this application.

In some feasible implementations, the network device and the terminal devices in the mobile communication system may be deployed on land, including being deployed indoor or outdoor, and being deployed as handheld or vehicle-mounted devices; or may be deployed on a water surface; or may be deployed on an airplane, an uncrewed aerial vehicle, a balloon, or a satellite in the air. Application scenarios of the network device and the terminal device are not limited in embodiments of this application.

In some feasible implementations, the network device 110 shown in FIG. 1 may send a broadcast/multicast/groupcast PDCCH to the terminal device 120, the terminal device 130, and the terminal device 140. However, because the terminal device 120, the terminal device 130, and the terminal device 140 each have a respective active BWP, and the active BWP of each terminal device is independently configured, not all of the terminal devices 120, 130, and 140 can receive the broadcast/multicast/groupcast PDCCH. If a terminal device cannot receive the broadcast/multicast/groupcast PDCCH, the terminal device cannot receive a PDSCH scheduled by the PDCCH, and therefore cannot receive broadcast/multicast/groupcast data carried on the PDSCH. In other words, broadcast/multicast/groupcast transmission and communication cannot be implemented.

Therefore, embodiments of this application provide a communication method, to implement 5G NR broadcast/multicast/groupcast communication, and implement broadcast/multicast/groupcast downlink data transmission on a uniform frequency domain resource.

The following describes in detail the communication method provided in embodiments of this application with reference to FIG. 2 to FIG. 4(a) and FIG. 4(b).

It can be understood that, in actual application, in the communication method provided in embodiments of this application, a quantity of terminal devices may be greater than or equal to 2, and a quantity of network devices may be greater than or equal to 1. For ease of understanding, the following uses only three terminal devices and one network device as an example to describe the communication method provided in embodiments of this application. The three terminal devices may be a first terminal device, a second terminal device, and a third terminal device. Optionally, the first terminal device may be the terminal device 120 shown in FIG. 1, the second terminal device may be the terminal device 130 shown in FIG. 1, and the third terminal device may be the terminal device 140 shown in FIG. 1.

It can be understood that, for the network device on a network side, if the network device needs to implement broadcast/multicast/groupcast downlink transmission with a group of terminal devices, the network device needs to know information about the group of terminal devices. It may be noted that, on the network side, the network device may obtain information about each terminal device in the group of terminal devices, or may configure information for the group of terminal devices. Therefore, for the network side, the communication method provided in embodiments of this application is communication (interaction) between a single network device and a plurality of terminal devices.

It may alternatively be understood that, for the terminal devices on a user side, during broadcast/multicast/groupcast downlink transmission, each terminal device may receive information sent by the network device, and each terminal device can know only behavior (for example, receiving of what information) of the terminal device, but cannot know behavior of another terminal device in the group of terminal devices. Therefore, for the user side, the communication method provided in embodiments of this application is communication (interaction) between a single terminal device and a single network device.

Figure 2:
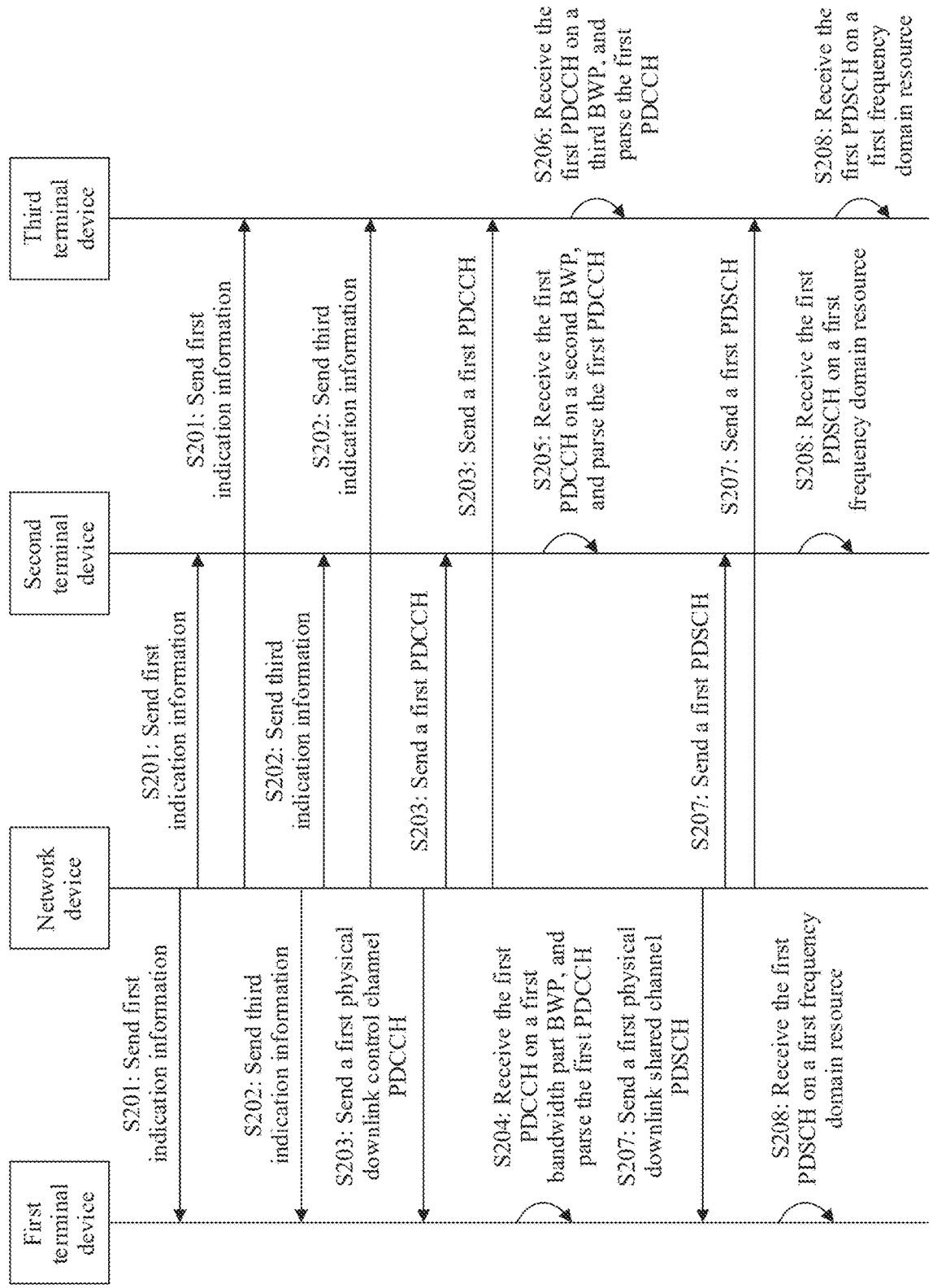
FIG. 2 is a schematic flowchart of a communication method according to an embodiment of this application.

FIG. 2 is a schematic flowchart of a communication method according to an embodiment of this application. As shown in FIG. 2, the communication method provided in this embodiment of this application includes but is not limited to the following steps:

S201: A network device sends first indication information. Correspondingly, a first terminal device, a second terminal device, and a third terminal device separately receive the first indication information.

In some feasible implementations, the first indication information may be higher layer signaling. For example, the first indication information is RRC signaling or a media access control layer control element (MAC CE). The first indication information may indicate a first frequency domain resource, and the first frequency domain resource may be a frequency domain resource configured by using the higher layer signaling.

In some feasible implementations, the first frequency domain resource may be a subset of a frequency domain resource corresponding to a first BWP. Further, the first frequency domain resource may be a proper subset of the frequency domain resource corresponding to the first BWP. The first BWP may be an active BWP of a terminal device in a group of terminal devices, that is, the terminal device is configured to receive and/or send information on the first BWP. The first BWP may be a dedicated BWP of the terminal device (UE dedicated BWP). In another embodiment, the first BWP may be an active BWP of a specific terminal, and the specific terminal may be configured or preset. Alternatively, the first BWP may be one or more system-configured BWPs. Specifically, the first indication information may include at least one of a frequency domain width, a starting frequency domain position, or a numerology of the first frequency domain resource.

In some feasible implementations, the starting frequency domain position of the first frequency domain resource may be represented as a frequency offset between point A and a lowest RB included in the first frequency domain resource (where in an embodiment, if index values are sorted in ascending order of frequencies, the starting frequency domain position herein may refer to an RB with a smallest index value in the first frequency domain resource), where point A is a common reference point of a resource block grid. Bandwidth (namely, the frequency domain width) of the first frequency domain resource may be represented as a quantity of RBs, a quantity of resource block groups (RBGs), or a quantity of REGs included in the first frequency domain resource. The numerology of the first frequency domain resource may be consistent with a numerology of the first BWP, and may include a subcarrier spacing (SCS) and a cyclic prefix (CP). To be specific, the SCS of the first frequency domain resource is the same as an SCS of the first BWP, and the CP of the first frequency domain resource is the same as a CP of the first BWP. Optionally, the first frequency domain resource may be a consecutive and uninterrupted frequency domain resource. "Consecutive and uninterrupted" herein may be physically consecutive and uninterrupted; or may be logically consecutive and uninterrupted, indicating that indexes of RBs included in the first frequency domain resource may be consecutive.

In some feasible implementations, an indication field of the first frequency domain resource (where the indication field herein refers to the frequency domain position and the bandwidth of the first frequency domain resource) may include a resource indication value (M). The resource indication value may be expressed as follows:

if $(L_{RBs}-1) \leq \lfloor N_{BWP}^{size}/2 \rfloor$, $$RIV = N_{BWP}^{size}(L_{RBs}-1) + RB_{start};$$

otherwise, to be specific, if $(L_{RBs}-1) > \lfloor N_{BWP}^{size}/2 \rfloor$, $$RIV = N_{BWP}^{size}(N_{BWP}^{size}-L_{RBs}+1) + (N_{BWP}^{size}-1-RB_{start}),$$ where $1 \leq L_{RBs} \leq N_{BWP}^{size} - RB_{start}$, and $RB_{start}$ represents a start RB index of the first frequency domain resource, $L_{RBs}$ represents a quantity of RBs consecutively allocated to the first frequency domain resource, and $N_{BWP}^{size}$ represents a quantity of physical resource blocks (namely, a quantity of RBs) occupied by the first BWP.

In some feasible implementations, the network device determines a group of terminal devices that receive broadcast/multicast/groupcast transmission. The group of terminal devices may be all terminal devices in a cell in which the network device is located, or may be some terminal devices in a cell in which the network device is located. In some extreme cases, the group of terminal devices may include only a single terminal device. The network device may configure an active BWP for each terminal device in the group of terminal devices. For example, the group of terminal devices may include a first terminal device, a second terminal device, and a third terminal device. Because the active BWP of the terminal device is configured by the network device, the network device may determine respective active MVPs of the first terminal device, the second terminal device, and the third terminal device. For ease of description, in the following, the first BWP is used as the active BWP of the first terminal device, the active BWP of the second terminal device is referred to as a second BWP, and the active BWP of the third terminal device is referred to as a third BWP. The network device may configure a first frequency domain resource for the group of terminal devices (including the first terminal device, the second terminal device, and the third terminal device). The first frequency domain resource is for receiving the broadcast/multicast/groupcast transmission. After determining the first frequency domain resource, the network device may send first indication information to the group of terminal devices to indicate the first frequency domain resource. Correspondingly, at least one of the first terminal device, the second terminal device, or the third terminal device in the group of terminal devices receives the first indication information. The first frequency domain resource may be a subset or a proper subset of an intersection set of the frequency domain resource corresponding to the first BWP, a frequency domain resource corresponding to the second BWP, and a frequency domain resource corresponding to the third BWP.

Optionally, the first frequency domain resource may be a frequency domain resource corresponding to a sub-BWP (or referred to as sub-bandwidth sub-band), and the sub-BWP may be a subset or a proper subset of an intersection set of the first BWP, the second BWP, and the third BWP. The first indication information may further include information related to the sub-BWP, for example, a related parameter such as a BWP-Common parameter. The BWP-Common parameter in the first indication information may indicate that the sub-BWP is a common BWP or a group common BWP. The common BWP may be common to a cell, indicating that all terminal devices in the entire cell can receive broadcast/multicast/groupcast downlink transmission on the BWP. The group common BWP indicates a BWP on which at least one group of terminal devices in several groups obtained through division of terminal devices in a cell can receive broadcast/multicast/groupcast downlink transmission. Further, optionally, information (or parameters) included in the first indication information may be indicated by a same information element or different information elements. For example, one information element indicates the CP, the SCS, and the frequency domain position and the bandwidth of the first frequency domain resource, and another information element indicates the information (or parameters) related to the sub-BWP, for example, BWP-ID, BWP-Common, or BWP-Dedicated.

Figure 3:
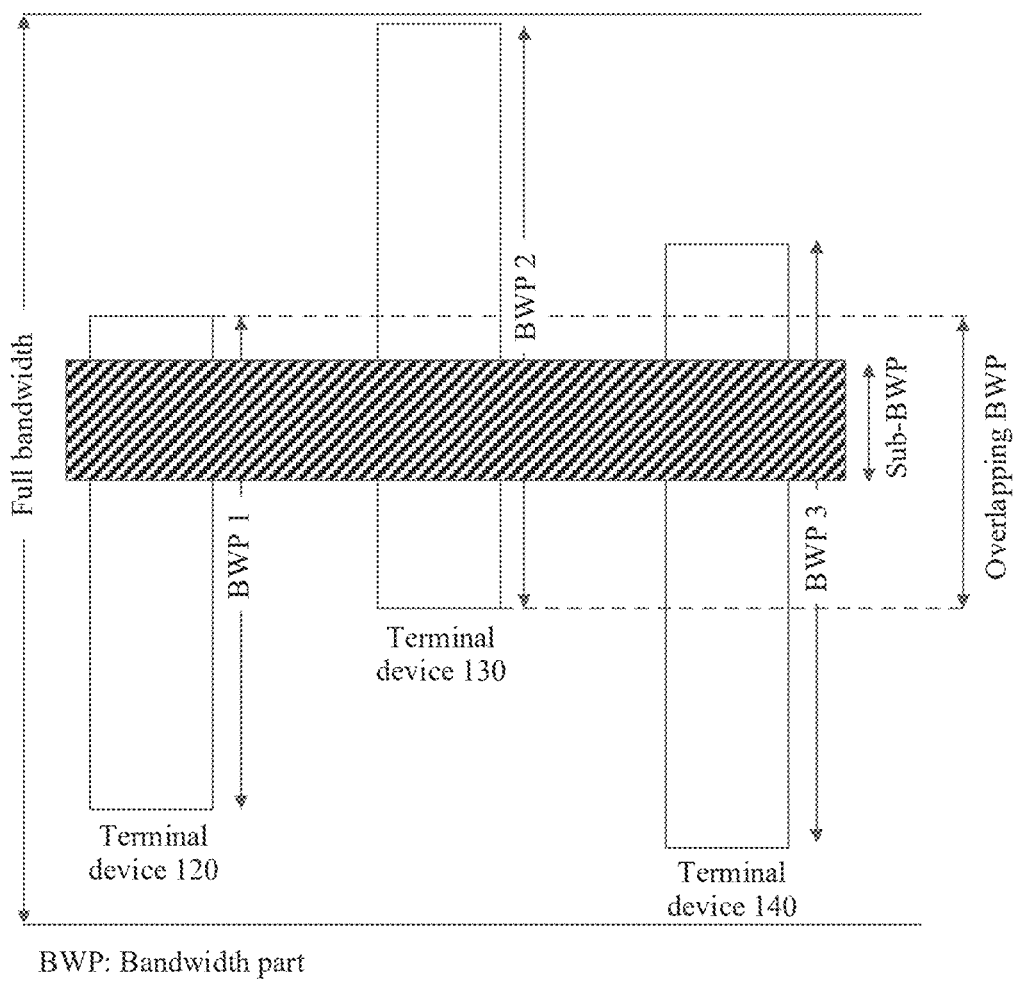
FIG. 3 is a schematic diagram of relationships between a sub-BWP and a first BWP, a second BWP, and a third BWP according to an embodiment of this application.

For example, FIG. 3 is a schematic diagram of relationships between a sub-BWP and a first BWP, a second BWP, and a third BWP according to an embodiment of this application. As shown in FIG. 3, the first BWP is BWP 1, the second BWP is BWP 2, and the third BWP is BWP 3; and the first terminal device is the terminal device 120, the second terminal device is the terminal device 130, and the third terminal device is the terminal device 140. As shown in FIG. 3, the sub-BWP is a part of an overlapping BWP of the first BWP, the second BWP, and the third BWP.

In some feasible implementations, the first terminal device may receive the first indication information sent by the network device, where the first frequency domain resource indicated by the first indication information may be a subset or a proper subset of a frequency domain resource corresponding to the first BWP, and the first BAT may be a dedicated BWP of the first terminal device. It is assumed that the first terminal device is UE #1, and the first BWP is a UE #1 dedicated BWP. Similarly, the second terminal device may receive the first indication information sent by the network device, where the first frequency domain resource indicated by the first indication information may be a subset or a proper subset of a frequency domain resource corresponding to the second BWP, and the second BWP may be a dedicated BWP of the second terminal device. It is assumed that the second terminal device is UE #2, and the second BWP is a UE #2 dedicated BWP. Still similarly, the third terminal device may receive the first indication information sent by the network device, where the first frequency domain resource indicated by the first indication information may be a subset or a proper subset of a frequency domain resource corresponding to the third BWP, and the third BWP may be a dedicated BWP of the third terminal device. It is assumed that the third terminal device is UE #3, and the third BWP is a UE #3 dedicated BWP.

S202: The network device sends third indication information. Correspondingly, the first terminal device, the second terminal device, and the third terminal device separately receive the third indication information.

In some feasible implementations, the third indication information may indicate a format of DCI carried on a first PDCCH. The format of the DCI is non-fallback DCI. The non-fallback DCI herein may refer to DCI format 1_1 or another DCI format other than fallback DCI (DCI format 1_0). Optionally, both the fallback DCI (DCI format 1_0) and the non-fallback DCI (for example, the DCI format 1_1) may be for scheduling a PDSCH, but the non-fallback DCI may carry richer control information than the fallback DCI. For example, the control information carried in the non-fallback DCI may include one or more of the following information: a carrier indication, a BWP indication, a physical resource block (PRB) binding size indicator, a rate matching indicator, a zero power channel state information reference signal (CSI-RS) trigger, a sounding reference signal (SRS) request, an antenna port, or a transmission configuration indicator. The control information carried in the fallback DCI includes none of the foregoing information. The BWP indication may: indicate an active BWP.

In some feasible implementations, the third indication information directly indicates whether the format of the DCI carried on the first PDCCH is the non-fallback DCI, and the third indication information may be higher layer parameter RRC signaling, for example, a non-fallback DCI switch parameter. If the non-fallback DCI switch parameter is set to ON, it indicates that the DCI carried on the first PDCCH is the non-fallback DCI. If the non-fallback DCI switch parameter is set to OFF, it indicates that the DCI carried on the first PDCCH is the fallback DCI. The format of the DCI may be directly determined by setting the non-fallback DCI switch parameter to ON or OFF. For example, if the non-fallback DCI switch parameter is set to OFF, the DCI format 1_0 is indicated.

Optionally, the non-fallback DCI switch parameter may be included in the first indication information. In this case, the network device does not need to separately send indication information (namely, the third indication information) to indicate the format of the DCI or indicate that the format of the DCI is the non-fallback DCI. It max be understood that, if the non-fallback DCI switch parameter is included in the first indication information, step S202 in this embodiment of this application may not be performed.

In some feasible implementations, the network device may send the third indication information to all the terminal devices in the cell in which the network device is located. It may be understood that the third indication information acts on all UEs in a cell instead of specific UE (per UE). Correspondingly, all the terminal devices in the cell in which the network device is located may receive the third indication information. Certainly, the first terminal device may receive the third indication information sent by the network device. Similarly, the second terminal device may receive the third indication information sent by the network device. Still similarly, the third terminal device may receive the third indication information sent by the network device.

The third indication information indicates the format of the DCI carried on the first PDCCH or indicates that the format of the DCI is the non-fallback DCI. The network device notifies, by using the third indication information, the terminal device that the format of the DCI may be the non-fallback DCI, that is, the network device notifies the terminal device that the terminal device can identify and receive the non-fallback DCI. Therefore, after the network device sends a PDCCH carrying non-fallback DCI, the terminal device may receive the PDCCH, and may perform operations such as demodulation and decoding on the non-fallback DCI carried on the PDCCH, to obtain control information carried in the non-fallback DCI. Therefore, in this embodiment of this application, the PDSCH may be scheduled by using the non-fallback DCI. In addition, because the non-fallback DCI can carry richer control information than the fallback DCI, multi-antenna/multi-user transmission can be supported (where this is because the non-fallback DCI includes the antenna port and the transmission configuration indicator), and flexibility of the broadcast/multicast/groupcast transmission in 5G NR can be improved.

S203: The network device sends the first PDCCH.

In some feasible implementations, the first PDCCH carries the DCI, and the format of the DCI may be the non-fallback DCI, for example, the DCI format 1_1. The first PDCCH may be scrambled by using a group-radio network temporary identifier (G-RNTI), and the first PDCCH (or the DCI format 1_1) may schedule a first PDSCH within a range of the first frequency domain resource. Optionally, a function of a PDCCH may be determined by an RNTI fix scrambling the PDCCH, and a PDCCH scrambled by using a G-RNTI is a PDCCH for the broadcast/multicast/groupcast transmission. Specifically, UE may identify the PDCCH by using the RNTI. For example, if the PDCCH is scrambled by using a G-RNTI, it indicates that the PDCCH is for scheduling the broadcast/multicast/groupcast transmission. If the PDCCH is scrambled by using a paging-radio network temporary identifier (paging-RNTI, P-RNTI), it indicates that the PDCCH is for scheduling a PDSCH for paging. If the PDCCH is scrambled by using a random access-radio network temporary identifier (random access-RNTI, RA-RNTI), it indicates that the PDCCH is for scheduling a PDSCH for random access.

In some feasible implementations, before sending the first PDCCH, the network device may send fourth indication information, where the fourth indication information indicates a first control resource set. The first control resource set may be a group-control resource set (group-CORESET, G-CORESET). A frequency domain resource corresponding to the first control resource set may be a subset or a proper subset of the first frequency domain resource. The fourth indication information may include information related to the first control resource set, for example, configuration information of the first control resource set.

In some feasible implementations, before sending the first PDCCH, the network device may alternatively send fifth indication information, where the fifth indication information indicates a first common search space associated with the first control resource set. The first common search space may be for monitoring the first PDCCH. The first common search space may be common to all the terminal devices or a group of terminal devices in the cell in which the network device is located, that is, all the terminal devices or the group of terminal devices can detect, in the first common search space, the first PDCCH scrambled by using the G-RNTI and a PDCCH scrambled by using another RNTI. Alternatively, the first common search space may be search space configured for the first PDCCH scrambled by using the G-RNTI, that is, all the terminal devices or the group of terminal devices can detect, in the first common search space, only the first PDCCH scrambled by using the G-RNTI.

In some other feasible implementations, the fourth indication information and the fifth indication information may be a same piece of indication information, that is, one piece of indication information may indicate the first control resource set and the first common search space associated with the first control resource set.

In some feasible implementations, after sending the fourth indication information and/or the fifth indication information, the network device may send, on the first frequency domain resource, the first PDCCH to a group of terminal devices (including the first terminal device, the second terminal device, and the third terminal device).

In an optional embodiment, the network device may send the second indication information in a broadcast manner. Correspondingly, the first terminal device, the second terminal device, and the third terminal device separately receive the second indication information.

In some feasible implementations, the second indication information may include a first frequency domain width, and the first frequency domain width may be for determining a second frequency domain resource. The second indication information may be included in a system message, and the second frequency domain resource may be a frequency domain resource configured in the system message. A starting frequency domain position of the second frequency domain resource is an RB (lowest RB) with a smallest index number (namely, sequence number) in a control resource set (namely, a CORESET) or a predefined BWP for receiving the first PDCCH (where the first PDCCH herein is a PDCCH scrambled by using a G-RNTI). The first frequency domain width (namely, a frequency domain width of the second frequency domain resource) may be a quantity of contiguous RBs corresponding to a CORESET 0. The CORESET 0 is indicated by a system message or configured by using higher layer signaling. The RB quantity of the CORESET 0 is 24, 48, or 96.

In an optional embodiment, the second indication information may alternatively indicate the first frequency domain width or some frequency domain parameters in an implicit manner or another manner, the second indication information is associated with the second resource, and the terminal device may determine a second frequency domain resource based on a mapping relationship between the second indication information and the second resource.

Optionally, the first frequency domain resource and the second frequency domain resource are configured by the network device independently, that is, the configuration of the first frequency domain resource does not rely on the configuration of the second frequency domain resource. The terminal device may directly determine the second frequency domain resource based on the configuration of the second frequency domain resource, without relying on a parameter notified during the configuration of the first frequency domain resource. The first frequency domain resource is configured by using higher layer signaling, and the second frequency domain resource is configured by using a system message. In another embodiment, that the first frequency domain resource and the second frequency domain resource are configured independently may be understood as follows: The starting frequency domain position of the first frequency domain resource is different from the starting frequency domain position of the second frequency domain resource, and/or the frequency domain width of the first frequency domain resource is different from the frequency domain width of the second frequency domain resource. It may be further understood that the first frequency domain resource and the second frequency domain resource have a same starting frequency domain position and different frequency domain widths. Alternatively, the first frequency domain resource and the second frequency domain resource have different starting frequency domain positions and a same frequency domain width. Alternatively, the first frequency domain resource and the second frequency domain resource have different starting frequency domain positions and different frequency domain widths.

For example, the starting frequency domain positions of the first frequency domain resource and the second frequency domain resource are both RB 15, the frequency domain width of the first frequency domain resource is 50 RBs, and the frequency domain width (namely, the first frequency domain width) of the second frequency domain resource is 48 RBs. That is, the first frequency domain resource is RB 15 to RB 65, and the second frequency domain resource is RB 15 to RB 63. For another example, the starting frequency domain position of the first frequency domain resource is RB 5, the starting frequency domain position of the second frequency domain resource is RB 20, and frequency domain widths of the first frequency domain resource and the frequency domain width (namely, the first frequency domain width) of the second frequency domain resource are both 96 RBs. That is, the first frequency domain resource is RB 5 to RB 101, and the second frequency domain resource is RB 20 to RB 116. For still another example, the starting frequency domain position of the first frequency domain resource is RB 12, the starting frequency domain position of the second frequency domain resource is RB 25, the frequency domain width of the first frequency domain resource is 100 RBs, and the frequency domain width (namely, the first frequency domain width) of the second frequency domain resource is 24 RBs. That is, the first frequency domain resource is RB 12 to RB 112, and the second frequency domain resource is RB 25 to RB 49.

In some feasible implementations, a PDCCH may carry DCI, and a PDSCH may be scheduled by using the DCI. A second PDSCH may be scheduled within a range of the second frequency domain resource by using fallback DCI (DCI format 1_0), that is, a frequency domain resource of the second PDSCH is the second frequency domain resource. The fallback DCI may be scrambled by using an RNTI different from a G-RNTI. For example, the fallback DCI may be scrambled by using any one of the following RNTIs: a cell-radio network temporary identifier (cell-RNTI, C-RNTI), a configured scheduling-radio network temporary identifier (configured scheduling-RNTI, CS-RNTI), a temporary cell-radio network temporary identifier (temporary cell-RNTI, TC-RNTI), a paging-radio network temporary identifier (paging-RNTI, P-RNTI), a system information-radio network temporary identifier (system information-RNTI, SI-RNTI), a random access-radio network temporary identifier (random access-RNTI, RA-RNTI), or an SPS-RNTI.

S204: The first terminal device receives the first PDCCH on the first BWP, and parses the first PDCCH.

S205: The second terminal device receives the first PDCCH on the second BWP, and parses the first PDCCH.

S206: The third terminal device receives the first PDCCH on the third BWP, and parses the first PDCCH.

In some feasible implementations, the first terminal device may receive the fourth indication information and/or the fifth indication information. Similarly, the second terminal device may receive the fourth indication information and/or the fifth indication information, and the third terminal device may receive the fourth indication information and/or the fifth indication information. The fourth indication information indicates the first control resource set, and the fourth indication information includes configuration information of the first control resource set.

Optionally, the configuration information of the first control resource set may include:

(a) a control resource set ID p, configured by using the controlResourceSetId parameter, where $0 \leq p < 12$;
(b) a demodulation reference signal (DMRS) scrambling sequence initialization value, configured by using the pdcch-DMRS-ScramblingID parameter;
(c) a precoder granularity for a plurality of REGs in frequency domain in which the UE may assume use of a same DMRS precoder, configured by using the precoderGranularity parameter;
(d) a CCE-to-REG mapping parameter, configured by using the cce-REG-MappingType parameter;
(e) an antenna port quasi co-location, selected from a set of antenna port quasi co-locations that are indicated by the TCI-Stat parameter, indicating quasi co-location information of a DMRS antenna port for PDCCH reception in each CORESET; and
(f) whether a transmission configuration indication (TCI) is present in DCI format 1_1 that is transmitted through a PDCCH and that is in the CORESET p, indicated by the TCI-PresentInDCI parameter.

The fifth indication information indicates the first common search space associated with the first control resource set. For each downlink BWP, S search space sets may be configured for each terminal device, and S is greater than 0 and not greater than 10. For each search space in the S search space sets, the network device performs the following configuration for the terminal device through signaling:

(A) a search space set index s, configured by using the searchSpaceId parameter, where $0 \leq s < 40$;
(B) an association relationship between the search space set s and the control resource set p, configured by using a controlResourceSetId parameter;
(C) a PDCCH monitoring periodicity of $k_s$ time units and a PDCCH monitoring offset of $O_s$ time units, configured by using the monitoringSlotPeriodicityAndOffset parameter, where the time remit may be a slot, a sub-slot, a mini-slot, or an OFDM symbol;
(D) a PDCCH monitoring pattern in a time unit, configured by using the monitoringSymbolsWithinSlot parameter, indicating the first symbol of the CORESET for PDCCH monitoring in the time unit, where the time unit may be a slot, a sub-slot, or a mini-slot;
(E) duration of $T_s < k_s$ time units, configured by using the duration parameter, indicating a quantity of time units in which the search space set s exists, where the time unit may be a slot, a sub-slot, or a mini-slot;
(F) whether the search space set s is a common search space or a UE dedicated search space, indicated by the searchSpaceType parameter; and
(G) a quantity of PDCCH candidates at each CCE aggregation level L, indicated by the nrofCandidates parameter.

Therefore, the first terminal device may receive, on the first BWP (namely, the active BWP of the first terminal device) or on the first frequency domain resource based on the first control resource set and the first common search space, the first PDCCH sent by the network device. After receiving the first PDCCH, the first terminal device may parse the first PDCCH on the first frequency domain resource, to obtain the DCI carried on the first PDCCH. It may be understood that a parsing range of the first PDCCH may be the first frequency domain resource. It may be further understood that a range indicated by a frequency domain resource allocation information field of the first PDCCH does not exceed the first frequency domain resource. Alternatively, after receiving the first PDCCH, the first terminal device may parse the first PDCCH on the frequency domain resource corresponding to the first BWP, to obtain the DCI carried on the first PDCCH. It may be understood that the parsing range of the first PDCCH may alternatively be the frequency domain resource corresponding to the first BWP. It may be further understood that the range indicated by the frequency domain resource allocation information field of the first PDCCH does not exceed the frequency domain resource corresponding to the first BWP. A parsing process may include processing such as demodulation and decoding. The first PDCCH is for scheduling a PDSCH, and the DCI carried on the first PDCCH may include one or more of the following information: time domain resource allocation information, frequency domain resource allocation information, a modulation and coding scheme (MCS), a redundancy version, a HARQ process number, a downlink assignment index, and a power control command for scheduling a physical uplink control channel (PUCCH), a PUCCH resource indicator, and a PDSCH-to-HARQ feedback timing indicator.

Figure 4A:
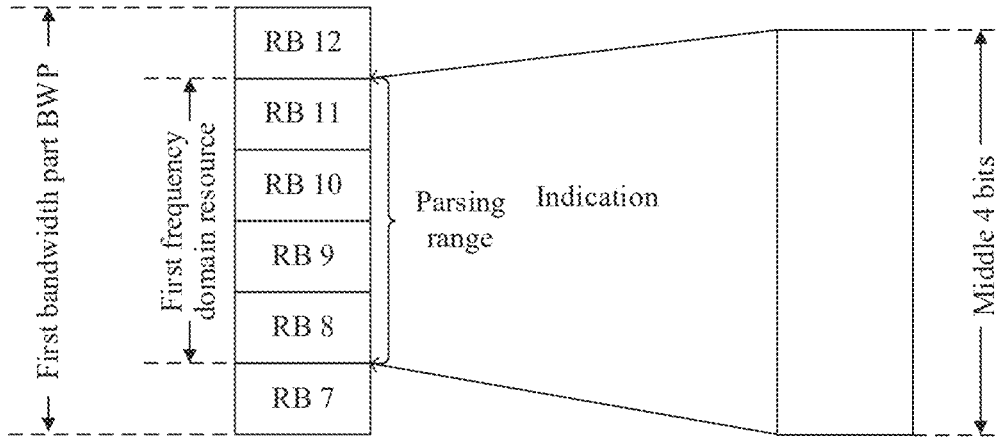
FIG. 4(a) and FIG. 4(b) each are a schematic diagram of a parsing range of a first PDCCH according to an embodiment of this application.
Figure 4B:
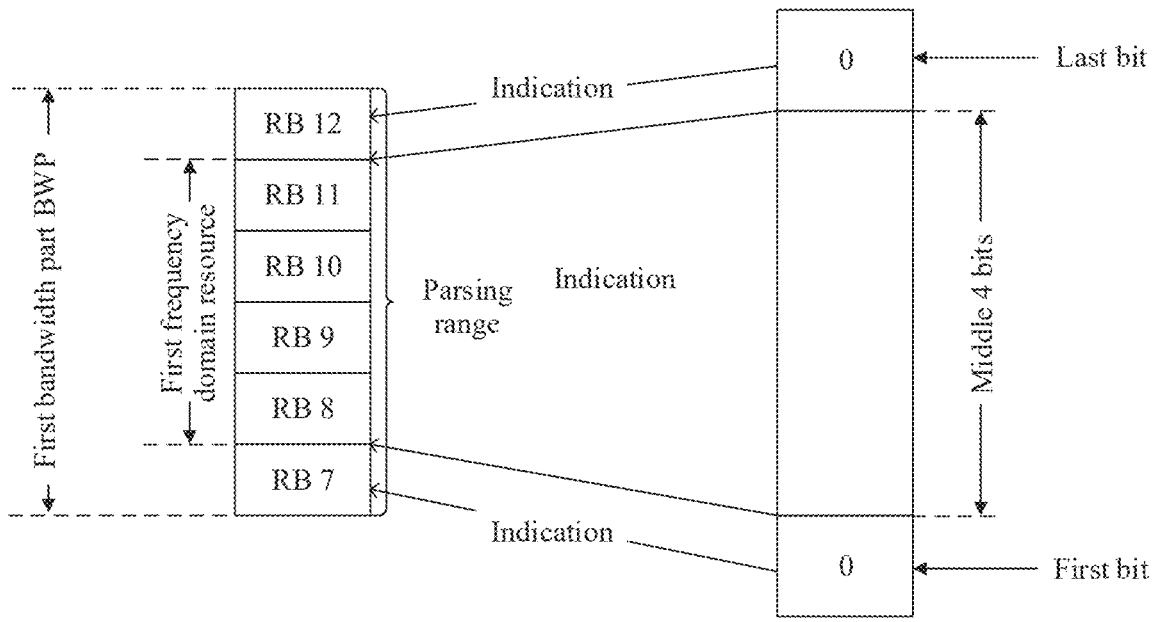

For example, FIG. 4(a) and FIG. 4(b) each are a schematic diagram of a parsing range of a first PDCCH according to an embodiment of this application. It is assumed that the frequency domain resource corresponding to the first BWP includes six RBs, and the six RBs are respectively indicated by 6 bits. It is assumed that the first frequency domain resource is middle four RBs in the six RBs, and the middle four RBs are respectively indicated by middle 4 bits in the 6 bits. As shown in FIG. 4(a), the first terminal device may parse the first PDCCH on the RBs indicated by the middle 4 bits, that is, the parsing range of the first PDCCH is the RBs indicated by the middle 4 bits. Alternatively, as shown in FIG. 4(b), the first terminal device may parse the first PDCCH on the RBs indicated by the six bits, that is, the parsing range of the first PDCCH is the RBs indicated by the six bits. The first bit and the last bit of the six bits may be set to 0 to invalidate the bits. To be specific, the first RB and the last RB in the frequency domain resource corresponding to the first BWP may carry no information (that is, carry empty information) or carry unicast control information.

In some feasible implementations, specific implementation in which the first terminal device receives the first PDCCH sent by the network device on the first BWP based on the first control resource set and the first common search space may be as follows: The first terminal device receives the first PDCCH in the first control resource set, and monitors the first PDCCH in the first common search space. The first common search space may include a PDCCH candidate. The first terminal device performs decoding and cyclic redundancy check (CRC) on all PDCCH candidates in the first common search space. If the CRC check succeeds, it is considered that content of the decoded PDCCHs is valid for the first terminal device, and a subsequent operation is performed by using information (such as a transmission scheduling indication, a slot format indication, and a power control command) obtained through decoding.

In some feasible implementations, similar to the first terminal device, the second terminal device may receive, on the second BWP (namely, the active BWP of the second terminal device), the first PDCCH sent by the network device, and may parse the first PDCCH on the first frequency domain resource or the frequency domain resource corresponding to the second BWP, to obtain the DCI carried on the first PDCCH. The third terminal device may receive, on the third BWP (namely, the active BWP of the third terminal device), the first PDCCH sent by the network device, and may parse the first PDCCH on the first frequency domain resource or the frequency domain resource corresponding to the third BWP, to obtain the DCI carried on the first PDCCH. It may be understood that, for implementation processes of the second terminal device and the third terminal device, refer to the foregoing implementation of the first terminal device. Details are not described herein again. Because the first frequency domain resource is a subset or a proper subset of an intersection set of the frequency domain resource corresponding to the first BWP, the frequency domain resource corresponding to the second BWP, and the frequency domain resource corresponding to the third BWP, the first terminal device, the second terminal device, and the third terminal device can all receive the first PDCCH on a uniform frequency domain resource (namely, the first frequency domain resource), and parses the first PDCCH to obtain the DCI.

S207: The network device sends the first PDSCH on the first frequency domain resource.

In some feasible implementations, the first PDSCH may carry broadcast/multicast/groupcast user data information. A frequency domain resource corresponding to the first PDSCH may be the same as or not completely the same as the first frequency domain resource. For example, a start RB position of the first PDSCH is the same as a start RB position of the first frequency domain resource, and an RB quantity of the first PDSCH is the same as an RB quantity of the first frequency domain resource. Alternatively, a start RB position of the first PDSCH is the same as a start RB position of the first frequency domain resource, and an RB quantity of the first PDSCH is less than an RB quantity of the first frequency domain resource. Alternatively, a start RB position of the first PDSCH is different from a start RB position of the first frequency domain resource, and an RB quantity of the first PDSCH is less than an RB quantity of the first frequency domain resource. In still another embodiment, that the start positions are the same or different herein may be respectively replaced with that end positions are the same or different. The start position may also mean that RB numbering starts from a lowest RB in a CORESET for receiving the DCI (RB numbering starts from the lowest RB of the CORESET in which the DCI was received). The network device may send the first PDSCH to a group of terminal devices including the first terminal device, the second terminal device, and the third terminal device) on the first frequency domain resource.

In this embodiment of this application, the frequency domain resource configuration corresponding to the first PDSCH is configured to be the same as or not completely the same as the first frequency domain resource. In addition, because the first frequency domain resource is flexible (where this is because the first frequency domain resource is a subset or a proper subset of an intersection set of frequency domain resources corresponding to active B\VPs of a group of terminal devices), flexibility of configuring a frequency domain resource for groupcast transmission can be improved, that is, the start RB position and the RB quantity of the first PDSCH may be flexibly configured and are not fixed. In other words, an RB quantity of a broadcast/multicast/groupcast PDSCH is not limited to one or more fixed values (for example, 24, 48, or 96 RBs corresponding to the CORESET 0), may be any value, and may be determined based on a size of user data of the broadcast/multicast/groupcast transmission.

In some feasible implementations, a sequence of performing step S207 and step S204 to step S206 in this embodiment of this application is not limited. For example, step S207 may be performed before step S204 to step S206, step S207 may be performed after step S204 to step S206, or step S207 may be performed simultaneously with step S204 to step S206.

S208: The first terminal device, the second terminal device, and the third terminal device receive the first PDSCH on the first frequency domain resource.

In some feasible implementations, the first terminal device may receive, on the first BWP (namely, the active BWP of the first terminal device) or the first frequency domain resource, the first PDSCH sent by the network device, and may perform operations such as demodulation and decoding on the first PDSCH on the first frequency domain resource based on the DCI carried on the first PDCCH, to obtain the broadcast/multicast/groupcast user data information carried on the first PDSCH. It may be understood that a parsing range of the first PDSCH may be the first frequency domain resource. The frequency domain position corresponding to the first PDSCH may be the same as the frequency domain position of the first frequency domain resource (that is, start RB positions are the same), and bandwidth (namely, a frequency domain width) corresponding to the first PDSCH may also be the same as the bandwidth of the first frequency domain resource (that is, RB quantities are the same). Optionally, the frequency domain resource corresponding to the first PDSCH may be a subset or a proper subset of the first frequency domain resource. In this embodiment of this application, a terminal device receives the first PDCCH on an active BWP of the terminal device, receives, on the active BWP of the terminal device or the first frequency domain resource, the first PDSCH scheduled by the first PDCCH, and parses the first PDSCH on the first frequency domain resource, to obtain the broadcast/multicast/groupcast user data information carried on the first PDSCH, so that broadcast/multicast/groupcast communication is implemented, and the broadcast/multicast/groupcast data transmission is implemented on the uniform frequency domain resource.

Similarly, the second terminal device may receive, on the second BWP or the first frequency domain resource, the first PDSCH sent by the network device, and may perform operations such as demodulation and decoding on the first PDSCH on the first frequency domain resource based on the DCI carried on the first PDCCH, to obtain the broadcast/multicast/groupcast user data carried on the first PDSCH. Still similarly, the third terminal device may receive, on the third BWP or the first frequency domain resource, the first PDSCH sent by the network device, and may perform operations such as demodulation and decoding on the first PDSCH on the first frequency domain resource based on the DCI carried on the first PDCCH, to obtain the broadcast/multicast/groupcast user data carried on the first PDSCH.

In this embodiment of this application, on one hand, the network device configures, in a frequency domain resource corresponding to a dedicated BWP (UE dedicated BWP) of a terminal device, the first frequency domain resource for the broadcast/multicast/groupcast transmission. When the terminal device needs to receive unicast transmission, the terminal device activates the UE dedicated BWP, and the terminal device may also receive groupcast transmission on the active BWP (where this is because some frequency domain resources of the active BWP are configured for the broadcast/multicast/groupcast transmission). That is, the unicast transmission and groupcast transmission can be completed in one BWP. Therefore, there is no need to additionally configure operating bandwidth for the broadcast/multicast/groupcast transmission. When the terminal device needs to frequently receive unicast transmission and groupcast transmission, there is no need to switch back and forth between unicast operating bandwidth and groupcast operating bandwidth, so that a switching latency is reduced. On the other hand, when one or more UE dedicated BWPs of one or more terminal devices in a group of terminal devices are switched, the first frequency domain resource for the broadcast/multicast/groupcast transmission is switched as the UE dedicated. BWPs are switched, that is, when a USE dedicated BWP changes, the first frequency domain resource also changes correspondingly. This is because the first frequency domain resource is a subset or a proper subset of an intersection set of frequency domain resources corresponding to active BWPs of a group of terminal devices. Therefore, during the broadcast/multicast/groupcast transmission, dynamic switching of a. UE dedicated BWP can also be supported.

The communication method in embodiments of this application is described in detail above. To better implement the foregoing solutions in embodiments of this application, embodiments of this application further provide corresponding devices.

Figure 5:
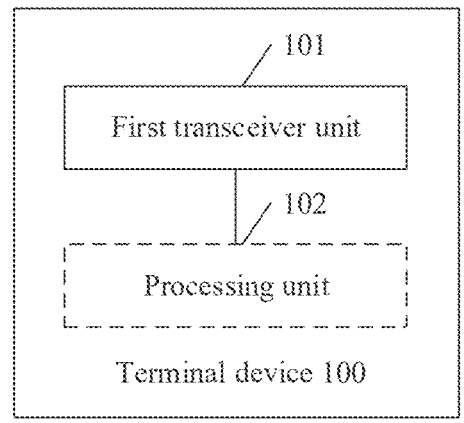
FIG. 5 is a schematic diagram of a structure of a terminal device according to an embodiment of this application.

FIG. 5 is a schematic diagram of a structure of a terminal device according to an embodiment of this application. As shown in FIG. 5, the terminal device 100 may include:

a first transceiver unit 101, configured to: receive first indication information, receive a first PDCCH on a first BWP, receive second indication information, and receive, on a first frequency domain resource indicated by the first indication information, a first PDSCH scheduled by the first PDCCH. The first indication information may indicate the first frequency domain resource, and the first frequency domain resource may be a subset or a proper subset of a frequency domain resource corresponding to the first BWP. The first BWP is a dedicated BWP of the terminal device. The first PDCCH may be scrambled by using a GANTT, and may schedule the first PDSCH within a range of the first frequency domain resource, that is, a range indicated by a frequency domain resource allocation information field of the first PDCCH is the first frequency domain resource. A parsing range of the first PDSCH is the first frequency domain resource. The second indication information may include a first frequency domain width, and the first frequency domain width may be for determining a second frequency domain resource. The first frequency domain resource and the second frequency domain resource are separately configured by the network device independently, that is, the configuration of the first frequency domain resource does not rely on the configuration of the second frequency domain resource. The terminal device may directly determine the second frequency domain resource based on the configuration of the second frequency domain resource, without relying on a parameter notified during the configuration of the first frequency domain resource. It may be understood that a starting frequency domain position of the first frequency domain resource is different from a starting frequency domain position of the second frequency domain resource, and/or a frequency domain width of the first frequency domain resource is different from a frequency domain width of the second frequency domain resource.

Optionally, the starting frequency domain position of the second frequency domain resource is an RB (lowest RB) with a smallest index number (namely, sequence number) in a control resource set (namely, a CORESET) or a predefined BWP for receiving the first PDCCH (where the first PDCCH herein is a PDCCH scrambled by using a G-RNTI). The frequency domain width (namely, the first frequency domain width) of the second frequency domain resource may be a quantity of contiguous RBs corresponding to a CORESET 0. The CORESET 0 may be indicated by a system message or configured by using higher layer signaling. The RB quantity of the CORESET 0 is 24, 48, or 96.

In some feasible implementations, the first transceiver unit 101 is specifically configured to: receive the first PDCCH on the first frequency domain resource.

In some feasible implementations, the first transceiver unit 101 is further configured to receive third indication information, where the third indication information indicates a format of DCI carried on the first PDCCH, and the format of the DCI carried on the first PDCCH is non-fallback DCI.

In some feasible implementations, the first indication information includes at least one of a starting frequency domain position, a frequency domain width, or a numerology of the first frequency domain resource, the numerology includes a subcarrier spacing and a cyclic prefix, and the numerology of the first frequency domain resource is the same as a numerology of the first BWP.

In some feasible implementations, the terminal device 100 may further include a processing unit 102. The processing unit 102 is configured to parse the first PDSCH received by the transceiver unit 101, to obtain user data information carried on the first PDSCH.

During specific implementation, for implementation of each module or unit, correspondingly, refer to corresponding descriptions of the terminal device in the method embodiment shown in FIG. 2, to perform a method and a function performed by the terminal device in the foregoing embodiment.

In this embodiment of this application, the terminal device receives the first frequency domain resource indicated by the network device by using the indication information, and receives and parses, on the first frequency domain resource, the first PDSCH scheduled by the first PDCCH, to obtain the user data carried on the first PDSCH. In addition, because the first PDCCH is scrambled by using the G-RNTI, it indicates that the first PDCCH is the PDCCH for the broadcast/multicast/groupcast transmission, it also indicates that data carried on the first PDSCH scheduled by the first PDCCH is broadcast/multicast/groupcast transmission data. Therefore, according to the terminal device provided in this embodiment of this application, the broadcast/multicast/groupcast communication can be implemented for 5G NR, and the broadcast/multicast/groupcast data transmission can be implemented on a uniform frequency domain resource (the first frequency domain resource).

Figure 6:
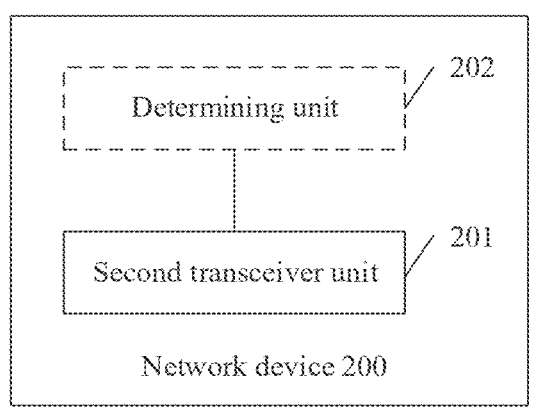
FIG. 6 is a schematic diagram of a structure of a network device according to an embodiment of this application.

FIG. 6 is a schematic diagram of a structure of a network device according to an embodiment of this application. As shown in FIG. 6, the network device 200 may include:

a second transceiver unit 201, configured to: send a first PDCCH and first indication information that indicates a first frequency domain resource, send second indication information including a first frequency domain width, and send a first PDSCH on the first frequency domain resource. The first indication information may indicate the first frequency domain resource, and the first frequency domain resource may be a subset or a proper subset of a frequency domain resource corresponding to the first BWP. The first BWP is a dedicated BWP of a terminal device. The first PDCCH may be scrambled by using a G-RNTI, and may schedule the first PDSCH within a range of the first frequency domain resource, that is, a range indicated by a frequency domain resource allocation information field of the first PDCCH is the first frequency domain resource. A parsing range of the first PDSCH is the first frequency domain resource. The second indication information may include a first frequency domain width, and the first frequency domain width may be for determining a second frequency domain resource. The first frequency domain resource and the second frequency domain resource are separately configured by the network device independently, that is, the configuration of the first frequency domain resource does not rely on the configuration of the second frequency domain resource. The terminal device may directly determine the second frequency domain resource based on the configuration of the second frequency domain resource, without relying on a parameter notified during the configuration of the first frequency domain resource. It may be understood that a starting frequency domain position of the first frequency domain resource is different from a starting frequency domain position of the second frequency domain resource, and/or a frequency domain width of the first frequency domain resource is different from a frequency domain width of the second frequency domain resource.

Optionally, the starting frequency domain position of the second frequency domain resource is an RB (lowest RB) with a smallest index number namely, sequence number) in a control resource set (namely, a CORESET) or a predefined BWP for receiving the first PDCCH (where the first PDCCH herein is a PDCCH scrambled by using a G-RNTI). The frequency domain width (namely, the first frequency domain width) of the second frequency domain resource may be a quantity of contiguous RBs corresponding to a CORESET 0. The CORESET 0 may be indicated by a system message or configured by using higher layer signaling. The RB quantity of the CORESET 0 is 24, 48, or 96.

In some feasible implementations, the network device 200 further includes a determining unit 202. The determining unit 202 is configured to determine the first frequency domain resource before sending the first indication information.

In some feasible implementations, the second transceiver unit 201 is specifically configured to send the first PDCCH on the first frequency domain resource.

In some feasible implementations, the second transceiver unit 201 is further configured to send third indication information, where the third indication information indicates a format of DCI carried on the first PDCCH, and the format of the DCI carried on the first PDCCH is non-fallback DCI.

In some feasible implementations, the first indication information includes at least one of a starting frequency domain position, a frequency domain width, or a numerology of the first frequency domain resource, the numerology includes a subcarrier spacing and a cyclic prefix, and the numerology of the first frequency domain resource is the same as a numerology of the first BWP.

The determining unit 202 may be a processing unit.

During specific implementation, for implementation of each module or unit, correspondingly, refer to corresponding descriptions of the network device in the method embodiment shown in FIG. 2, to perform a method and a function performed by the network device in the foregoing embodiment.

In this embodiment of this application, the network device configures, in a frequency domain resource corresponding to the dedicated BWP (UE dedicated BWP) of the terminal device, the first frequency domain resource for the broadcast/multicast/groupcast transmission. When the terminal device needs to receive unicast transmission, the terminal device activates the UE dedicated BWP, and the terminal device may also receive groupcast transmission on the active BWP (where this is because some frequency domain resources of the active BWP are configured for the broadcast/multicast/groupcast transmission). That is, the unicast transmission and the groupcast transmission may be completed in one BWP. Therefore, there is no need to additionally configure operating bandwidth for the broadcast/multicast/groupcast transmission. When the terminal device needs to frequently receive unicast transmission and groupcast transmission, there is no need to switch back and forth between unicast operating bandwidth and groupcast operating bandwidth, so that a switching latency is reduced.

Figure 7:
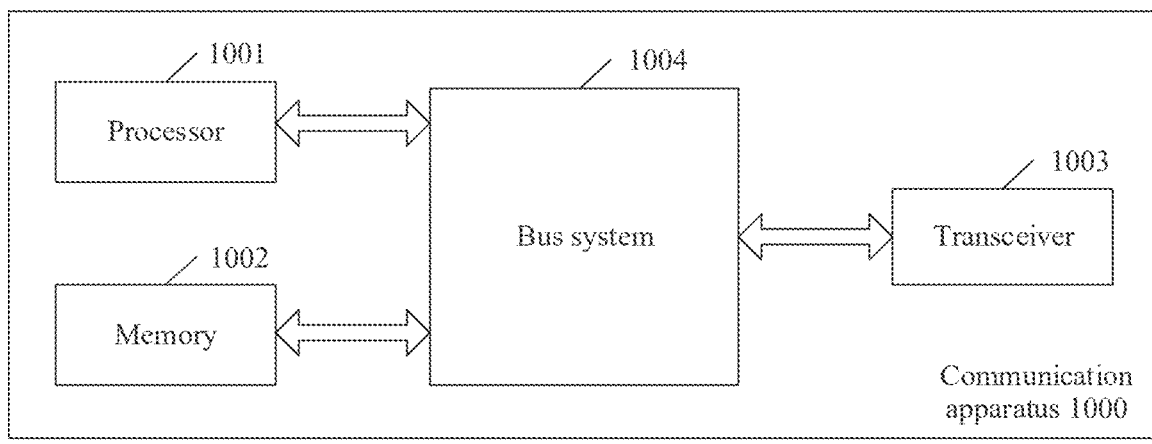
FIG. 7 is a schematic diagram of a structure of a communication apparatus according to an embodiment of this application.

FIG. 7 is a schematic diagram of a structure of a communication apparatus 1000 according to an embodiment of this application. As shown in FIG. 7, the communication apparatus 1000 provided in this embodiment of this application includes a processor 1001, a memory 1002, a transceiver 1003, and a bus system 1004. The communication apparatus provided in this embodiment of this application may be either of a terminal device and a network device.

The processor 1001, the memory 1002, and the transceiver 1003 are connected by using the bus system 1004.

The memory 1002 is configured to store a program. Specifically, the program may include program code, and the program code includes computer operation instructions. The memory 1002 includes but is not limited to a random access memory (RAM), a read-only memory (ROM), an erasable programmable read-only memory (EPROM), or a compact disc read-only memory (CD-ROM). Only one memory is shown in FIG. 7. Certainly, a plurality of memories may be disposed as required. The memory 1002 may alternatively be a memory in the processor 1001. This is not limited herein.

The memory 1002 stores the following elements, executable units or data structures, or subsets or extended sets thereof:
 operation instructions: including various operation instructions, for implementing various operations; and
 an operating system: including various system programs, for implementing various basic services and process a hardware-based task.

The processor 1001 controls an operation of the communication apparatus 1000. The processor 1001 may be one or more central processing units (CPUs). When the processor 1001 is one CPU, the CPU may be a single-core CPU, or may be a multi-core CPU.

During specific application, components of the communication apparatus 1000 are coupled together by using the bus system 1004. In addition to a data bus, the bus system 1004 includes a power bus, a control bus, a status signal bus, and the like. However, for clear description, various buses in FIG. 7 are marked as the bus system 1004. For ease of representation, only illustrative depiction is provided in FIG. 7.

The method of the terminal device in FIG. 2 provided in embodiments of this application, or the method of the network device in FIG. 2 provided in embodiments of this application may be applied to the processor 1001, or may be implemented by the processor 1001. The processor 1001 may be an integrated circuit chip and has a signal processing capability. In an implementation process, each step in the foregoing method may be completed by using an integrated logic circuit of hardware in the processor 1001 or instructions in a form of software. The foregoing processor 1001 may be a general-purpose processor, a digital signal processor (DSP), an application-specific integrated circuit (ASIC), a field-programmable gate array (FPGA) or another programmable logic device, a discrete gate or a transistor logic device, or a discrete hardware component. The methods, steps, and logical block diagrams that are disclosed in embodiments of this application may be implemented or performed. The general-purpose processor may be a microprocessor, or the processor may be any conventional processor or the like. The steps in the method disclosed with reference to embodiments of this application may be directly performed and completed by a hardware decoding processor, or may be performed and completed by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory 1002. The processor 1001 reads information in the memory 1002, and performs, in combination with hardware of the processor 1001, the method steps of the terminal device described in FIG. 2, or performs, in combination with hardware of the processor 1001, the method steps of the network device described in FIG. 2.

An embodiment of this application further provides a computer program product. The computer program product includes computer program code. When the computer program code is run on a computer, the computer is enabled to perform the method steps of the terminal device described in FIG. 2. Alternatively, when the computer program code is run on a computer, the computer is enabled to perform the method steps of the network device described in FIG. 2.

An embodiment of this application further provides a chip, including a processor. The processor is configured to read and execute a computer program stored in a memory, to perform the communication method in any one of the possible implementations of FIG. 2. Optionally, the chip further includes the memory, and the memory is connected to the processor by using a circuit or a wire. Further, optionally, the chip further includes a communication interface, and the processor is connected to the communication interface. The communication interface is configured to receive data and/or information that need/needs to be processed. The processor obtains the data and/or the information from the communication interface, processes the data and/or the information, and outputs a processing result through the communication interface. The communication interface may be an input/output interface.

Optionally, the processor and the memory may be physically independent units, or the memory may be integrated with the processor.

In another embodiment of this application, a communication system is further provided. The communication system includes a terminal and a base station. For example, the terminal in the communication system may be any terminal device in the communication method provided in FIG. 2, or the terminal in the communication system may be the terminal device 100 in FIG. 5. The base station in the communication system may be the network device in the communication method provided in FIG. 2, or the base station in the communication system may be the network device 200 in FIG. 6.

A person of ordinary skill in the art may understand that all or some of the procedures of the method in the embodiments may be implemented by a computer program instructing related hardware. The program may be stored in the computer-readable storage medium. When the program is executed, the procedures in the method embodiments may be included. The storage medium includes any medium that can store program code, such as a ROM or a random access memory RAM, a magnetic disk, or a compact disc.

The foregoing descriptions are merely specific implementations of the present invention, but are not intended to limit the protection scope of the present invention. Any variation or replacement readily floured out by a person skilled in the art within the technical scope disclosed in the present invention shall fall within the protection scope of the present invention. Therefore, the protection scope of the present invention shall be subject to the protection scope of the claims.

What is claimed is:

1. A communication method, comprising:
    receiving, by a terminal device, first indication information, wherein the first indication information indicates a first frequency domain resource, the first frequency domain resource is a subset of a frequency domain resource corresponding to a first bandwidth part (BWP), and the first BWP is a dedicated BWP of the terminal device;
    receiving, by the terminal device, a first physical downlink control channel (PDCCH) on the first BWP, wherein the first PDCCH is scrambled by using a group-radio network temporary identifier (G-RNTI), the first PDCCH scrambled by using the G-RNTI is a PDCCH for broadcast, multicast, or groupcast transmission, and the first PDCCH schedules a first physical downlink shared channel (PDSCH) within a range of the first frequency domain resource;
    receiving, by the terminal device, second indication information, wherein the second indication information comprises a first frequency domain width, the first frequency domain width is for determining a second frequency domain resource, and a starting frequency domain position of the second frequency domain resource is a resource block (RB) with a smallest sequence number in a control resource set or a pre-defined BWP for receiving the first PDCCH; and
    receiving, by the terminal device, the first PDSCH on the first frequency domain resource.

2. The method according to claim 1, wherein receiving, by the terminal device, the first PDCCH on the first BWP comprises:
    receiving, by the terminal device, the first PDCCH on the first frequency domain resource.

3. The method according to claim 1, wherein before receiving, by the terminal device, the first PDCCH on the first BWP, the method further comprises:
    receiving, by the terminal device, third indication information, wherein the third indication information indicates a format of downlink control information (DCI) carried on the first PDCCH, and the format of the DCI carried on the first PDCCH is non-fallback DCI.

4. The method according to claim 1, wherein the first indication information comprises at least one of a starting frequency domain position, a frequency domain width, or a numerology of the first frequency domain resource, the numerology comprises a subcarrier spacing and a cyclic prefix, and the numerology of the first frequency domain resource is the same as a numerology of the first BWP.

5. The method according to claim 1, wherein the first frequency domain width is a quantity of contiguous RBs corresponding to a control resource set (CORESET) 0.

6. The method according to claim 1, wherein the first PDCCH is sent to a plurality of terminal devices in a group, and the plurality of terminal devices in the group includes the terminal device.

7. A communication method, comprising:
    sending, by a network device, first indication information, wherein the first indication information indicates a first frequency domain resource, the first frequency domain resource is a subset of a frequency domain resource corresponding to a first bandwidth part (BWP), and the first BWP is a dedicated BWP of a terminal device;
    sending, by the network device, a first physical downlink control channel (PDCCH), wherein the first PDCCH is scrambled by using a group-radio network temporary identifier (G-RNTI), the first PDCCH scrambled by using the G-RNTI is a PDCCH for broadcast, multicast, or groupcast transmission, and the first PDCCH schedules a first physical downlink shared channel (PDSCH) within a range of the first frequency domain resource;
    sending, by the network device, second indication information, wherein the second indication information comprises a first frequency domain width, the first frequency domain width is for determining a second frequency domain resource, and a starting frequency domain position of the second frequency domain resource is a resource block (RB) with a smallest sequence number in a control resource set or a pre-defined BWP for receiving the first PDCCH; and
    sending, by the network device, the first PDSCH on the first frequency domain resource.

8. The method according to claim 7, wherein sending, by the network device, the first PDCCH comprises:
    sending, by the network device, the first PDCCH on the first frequency domain resource.

9. The method according to claim 7, wherein before sending, by the network device, the first PDCCH, the method further comprises:
    sending, by the network device, third indication information, wherein the third indication information indicates a format of downlink control information (DCI) carried on the first PDCCH, and the format of the DCI carried on the first PDCCH is non-fallback DCI.

10. The method according to claim 7, wherein the first indication information comprises at least one of a starting frequency domain position, a frequency domain width, or a numerology of the first frequency domain resource, the numerology comprises a subcarrier spacing and a cyclic prefix, and the numerology of the first frequency domain resource is the same as a numerology of the first BWP.

11. The method according to claim 7, wherein the first frequency domain width is a quantity of contiguous RBs corresponding to a control resource set (CORESET) 0.

12. A terminal device, comprising at least one processor, a transceiver, and a memory, wherein the memory stores programming instructions for execution by the at least one processor to perform operations comprising:
    receiving first indication information, wherein the first indication information indicates a first frequency domain resource, the first frequency domain resource is a subset of a frequency domain resource corresponding to a first bandwidth part (BWP), and the first BWP is a dedicated BWP of the terminal device;
    receiving a first physical downlink control channel (PDCCH) on the first BWP, wherein the first PDCCH is scrambled by using a group-radio network temporary identifier (G-RNTI), the first PDCCH scrambled by using the G-RNTI is a PDCCH for broadcast, multicast, or groupcast transmission, and the first PDCCH schedules a first physical downlink shared channel (PDSCH) within a range of the first frequency domain resource;

receiving second indication information, wherein the second indication information comprises a first frequency domain width, the first frequency domain width is for determining a second frequency domain resource, and a starting frequency domain position of the second frequency domain resource is a resource block (RB) with a smallest sequence number in a control resource set or a predefined BWP for receiving the first PDCCH; and receiving the first PDSCH on the first frequency domain resource.

13. The terminal device according to claim 12, the operations further comprising:
receiving the first PDCCH on the first frequency domain resource.

14. The terminal device according to claim 12, the operations further comprising:
receiving third indication information, wherein the third indication information indicates a format of downlink control information (DCI) carried on the first PDCCH, and the format of the DCI carried on the first PDCCH is non-fallback DCI.

15. The terminal device according to claim 12, wherein the first indication information comprises at least one of a starting frequency domain position, a frequency domain width, or a numerology of the first frequency domain resource, the numerology comprises a subcarrier spacing and a cyclic prefix, and the numerology of the first frequency domain resource is the same as a numerology of the first BWP.

16. The terminal device according to claim 12, wherein the first frequency domain width is a quantity of contiguous RBs corresponding to a control resource set (CORESET) 0.

17. A network device, comprising at least one processor, a transceiver, and a memory, wherein the memory stores programming instructions for execution by the at least one processor to perform operations comprising:
sending first indication information, wherein the first indication information indicates a first frequency domain resource, the first frequency domain resource is a subset of a frequency domain resource corresponding to a first bandwidth part (BWP), and the first BWP is a dedicated BWP of a terminal device;

sending a first physical downlink control channel (PDCCH), wherein the first PDCCH is scrambled by using a group-radio network temporary identifier (G-RNTI), the first PDCCH scrambled by using the G-RNTI is a PDCCH for broadcast, multicast, or groupcast transmission, and the first PDCCH schedules a first physical downlink shared channel (PDSCH) within a range of the first frequency domain resource;

sending second indication information, wherein the second indication information comprises a first frequency domain width, the first frequency domain width is for determining a second frequency domain resource, and a starting frequency domain position of the second frequency domain resource is a resource block (RB) with a smallest sequence number in a control resource set or a predefined BWP for receiving the first PDCCH; and sending the first PDSCH on the first frequency domain resource.

18. The network device according to claim 17, the operations further comprising:
sending the first PDCCH on the first frequency domain resource.

19. The network device according to claim 17, the operations further comprising:
sending third indication information, wherein the third indication information indicates a format of downlink control information (DCI) carried on the first PDCCH, and the format of the DCI carried on the first PDCCH is non-fallback DCI.

20. The network device according to claim 17, wherein the first indication information comprises at least one of a starting frequency domain position, a frequency domain width, or a numerology of the first frequency domain resource, the numerology comprises a subcarrier spacing and a cyclic prefix, and the numerology of the first frequency domain resource is the same as a numerology of the first BWP.

* * * * *